(12) United States Patent
Petruska et al.

(10) Patent No.: US 8,198,336 B2
(45) Date of Patent: Jun. 12, 2012

(54) NANOCRYSTAL/SOL-GEL NANOCOMPOSITES

(75) Inventors: Melissa A. Petruska, Los Alamos, NM (US); Victor L. Klimov, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 994 days.

(21) Appl. No.: 11/810,508

(22) Filed: Jun. 5, 2007

(65) Prior Publication Data

US 2008/0103219 A1  May 1, 2008

Related U.S. Application Data

(62) Division of application No. 10/715,806, filed on Nov. 17, 2003, now Pat. No. 7,226,953.

(51) Int. Cl.
*B01J 13/00* (2006.01)
*B01J 13/22* (2006.01)
*C08J 7/04* (2006.01)

(52) U.S. Cl. .......... 516/101; 516/100; 516/98; 977/778; 977/830

(58) Field of Classification Search ............... 516/101, 516/100, 98; 977/773, 830
See application file for complete search history.

(56) References Cited

U.S. PATENT DOCUMENTS

2002/0110180 A1* 8/2002 Barney et al. ............. 374/161
2002/0155507 A1* 10/2002 Bruchez et al. ............. 435/7.2
2005/0266417 A1* 12/2005 Barany et al. ............... 435/6

* cited by examiner

*Primary Examiner* — Timothy J. Kugel
(74) *Attorney, Agent, or Firm* — Bruce H. Cottrell; Meredith H. Schoenfeld

(57) ABSTRACT

The present invention is directed to solid composites including colloidal nanocrystals within a sol-gel host or matrix and to processes of forming such solid composites. The present invention is further directed to alcohol soluble colloidal nanocrystals useful in formation of sol-gel based solid composites 4 Claims, 2 Drawing Sheets 6-amino-1-hexanol -capped NQDs    NQD-titania nanocomposite showing Ti-O bonds

NANOCRYSTAL/SOL-GEL NANOCOMPOSITES

This application is a division application of U.S. patent application Ser. No. 10/715806, filed on 17 Nov. 2003, which issued as U.S. Pat. No. 7,226,953.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to nanocrystal/sol-gel composites and to processes of forming such nanocrystal/sol-gel composites. Additionally, the present invention relates to alcohol-soluble colloidal nanocrystals.

BACKGROUND OF THE INVENTION

Semiconductor nanocrystals (NCs), often referred to as nanocrystal quantum dots (NQDs), are of interest for their size-tunable optical and electronic properties. Intermediate between the discrete nature of molecular clusters and the collective behavior of the bulk, NQDs are unique building blocks for the bottom-up assembly of complex functional structures. NQDs can be conveniently synthesized using colloidal chemical routes such as the solution-based organometallic synthesis approaches for the preparation of CdSe NQDs described by Murray et al., J. Am. Chem. Soc., 115, 8706 (1993) or by Peng et al., J. Am. Chem. Soc., 123, 183 (2001), such references incorporated herein by reference. Generally, these procedures involve an organometallic approach. Typically these chemical routes yield highly crystalline, monodisperse samples of NQDs. Because of their small dimensions (sub-10 nm) and chemical flexibility, colloidal NQDs can be viewed as tunable "artificial" atoms and as such can be manipulated into larger assemblies engineered for specific applications.

A significant challenge for obtaining stable optical properties and realizing optical applications of quantum dots is to incorporate the NQDs into a suitable transparent host matrix. Early attempts involved the direct growth of the nanoparticles within glassy matrices; however, the resulting materials were plagued by poorly controlled surface passivation, low filling factors and large size dispersities.

More recently, researchers have sought to decouple the synthesis of the nanoparticles from the fabrication of the composites. Selvan et al., Adv. Mater. v. 13, pp. 985-988 (2001) describe octylamine-passivated semiconductor quantum dots transferred into butanol prior to sol-gel processing with resultant volume fractions or loadings of only up to about 0.1 percent. Sundar et al., Adv. Mater., v. 14, pp. 739-742 (2002), describe incorporation of NCs wherein the surface-passivating ligands are replaced with tris(hydroxylpropyl) phosphine to stabilize the NCs in polar solvents such as ethanol and provide hydroxyl groups which can be reacted into a titania sol-gel matrix. Volume fractions or loadings as high as 10 to 12 percent were reported.

Despite the gradual progress, problems have remained. After long and careful research, new approaches have now been developed for the preparation of colloidal nanocrystal-containing composites.

It is an object of the present invention to provide new processes for preparing solid composites including colloidal nanocrystals and to provide the solid composites from such processes.

It is another object of the present invention to form solid composites with high volume loadings of the colloidal nanocrystals.

Still another object of the present invention is solid composites including colloidal nanocrystals where the solid composites are characterized by high refractive indices.

Still another object of the present invention is the preparation of alcohol-soluble colloidal nanocrystals including alcohol or carboxylic acid terminated groups thereon.

SUMMARY OF THE INVENTION

In accordance with the purposes of the present invention, as embodied and broadly described herein, the present invention provides a process for preparing a solid composite including colloidal nanocrystals dispersed within a sol-gel host, the process including forming an admixture of colloidal nanocrystals, a lower alcohol, a non-polar co-solvent and a sol-gel precursor material, and, forming the solid composite from the admixture. The present invention further provides a solid composite formed by the above process. In one embodiment, the lower alcohol is ethanol and the non-polar co-solvent is tetrahydrofuran.

The present invention still further provides a process for preparing a solid composite including colloidal nanocrystals dispersed within a sol-gel host matrix, the process including reacting colloidal nanocrystals passivated with hydrophobic ligands with a multi-functional compound of the formula $X_x$—$(Z_n)$—$Y_y$, where X is an amino group, a thiol group, a phosphonic acid group, a phosphine oxide group, a nitrile group, a thiocyanate group, or a carboxylic acid group, x is an integer and is one or more, Z is a hydrocarbon group, such as an alkyl group, an aryl group or an alkylaryl group, a polyether group, an ethylene oxide group, a propylene oxide group or a mixture thereof, n is from 1 to 20, Y is a hydroxyl group, a carboxylic acid group, a sulfonic acid group, a phosphonic acid group, or an alkoxysilane group, and y is an integer and is one or more, within a solvent to form a homogeneous colloidal nanocrystal solution including colloidal nanocrystals with at least a portion of hydroxyl-terminated groups, carboxylic acid-terminated groups, sulfonic acid-terminated groups, phosphonic acid-terminated groups, or alkoxysilane-terminated groups thereon; admixing the homogeneous colloidal nanocrystal solution and a sol-gel precursor material; and, forming the solid composite from the admixture. In one embodiment, the multi-functional molecule is an amino-hydroxyl compound such as 4-aminobutanol or 6-aminohexanol.

The present invention still further provides a solid composite that is the reaction product of colloidal nanocrystals including at least a portion of hydroxyl-terminated groups, carboxylic acid-terminated groups, sulfonic acid-terminated groups, phosphonic acid-terminated groups or alkoxysilane-terminated groups thereon and a sol-gel precursor material.

The present invention still further provides alcohol-soluble colloidal nanocrystals including the reaction product of colloidal nanocrystals and a multi-functional compound of the formula $X_x$—$(Z_n)$—$Y_y$, where X is an amino group, a thiol group, a phosphonic acid group, a phosphine oxide group, a nitrile group, a thiocyanate group, or a carboxylic acid group, x is an integer and is one or more, Z is a hydrocarbon group, such as an alkyl group, an aryl group or an alkylaryl group, a polyether group, an ethylene oxide group, a propylene oxide group or a mixture thereof, n is from 1 to 20, Y is a hydroxyl group, a carboxylic acid group, a sulfonic acid group, a phosphonic acid group, or an alkoxysilane group, and y is an integer and is one or more.

DETAILED-DESCRIPTION

Figure 1:
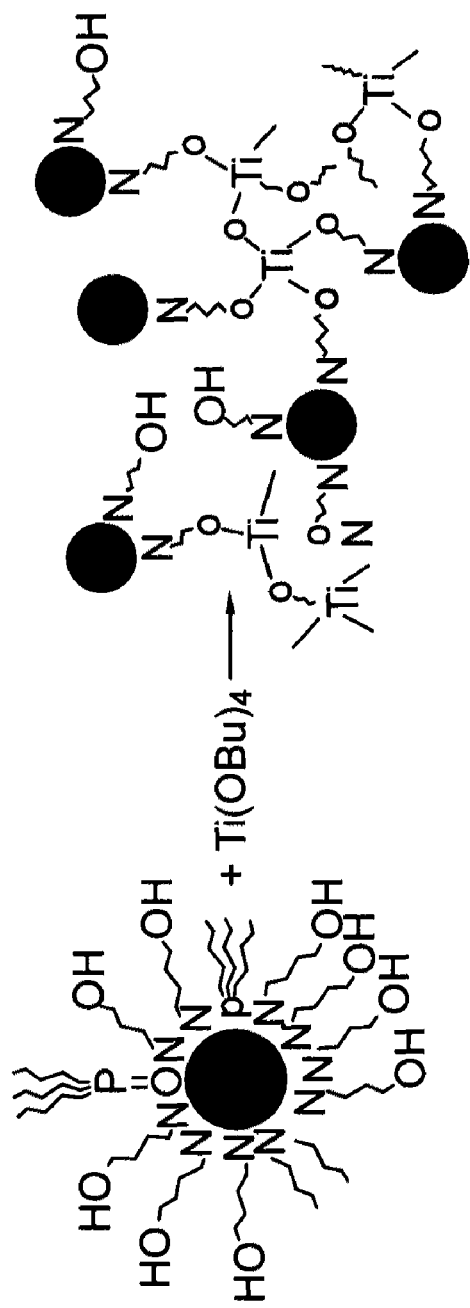
FIG. 1 shows a schematic illustration of a pathway by which colloidal nanocrystals can become incorporated into a sol-gel matrix.
Figure 2:
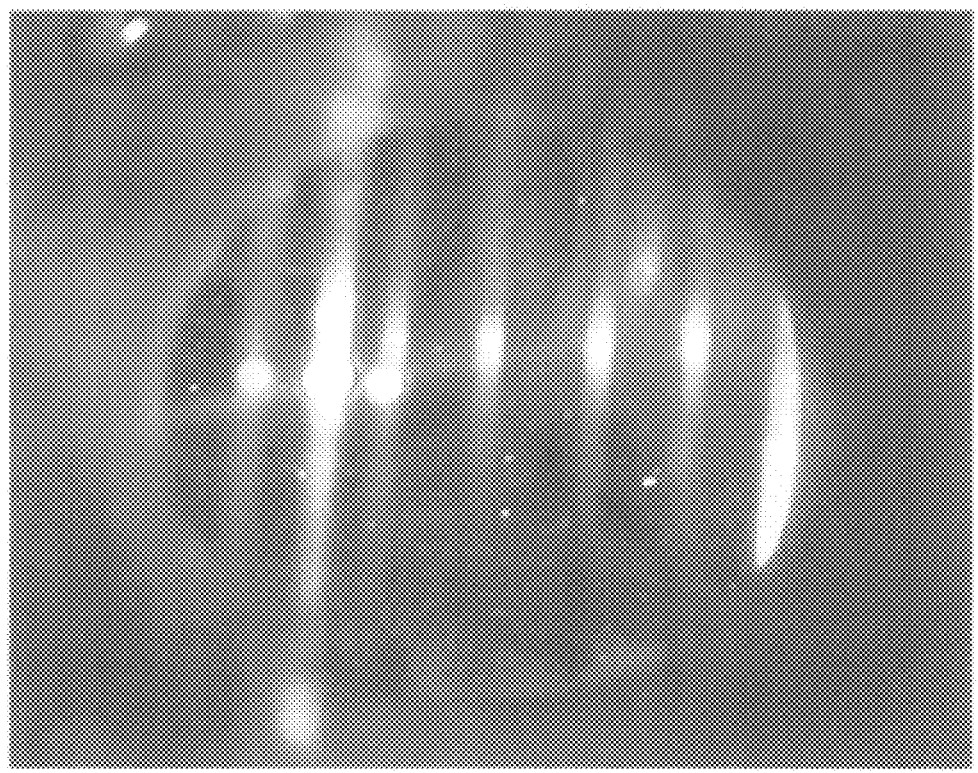
FIG. 2 shows a digital representation of a photomicrograph of a CdSe/sol-gel solid composite formed within a microcapillary tube. Micro-ring lasing by the colloidal CdSe nanocrystals within the microcapillary cavity was observed as the very bright spot in the center of the tube, which was under optical excitation at 400 nm. The CdSe colloidal nanocrystals were approximately 5 nm in diameter and emitted in the red.

The present invention is concerned with solid composites including colloidal nanocrystals within a sol-gel host or matrix and with processes of forming such solid composites. The present invention is further concerned with alcohol soluble colloidal nanocrystals useful in the formation of sol-gel based solid composites.

As used herein, the term "nanocrystal" refers to particles less than about 150 Angstroms in the largest axis, and preferably from about 10 to about 150 Angstroms. Also, within a particularly selected colloidal nanocrystal, the colloidal nanocrystals are substantially monodisperse, i.e., the particles have substantially identical size and shape.

The colloidal nanocrystals are generally members of a crystalline population having a narrow size distribution. The shape of the colloidal nanocrystals can be a sphere, a rod, a disk and the like. In one embodiment, the colloidal nanocrystals include a core of a binary semiconductor material, e.g., a core of the formula MX, where M can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In another embodiment, the colloidal nanocrystals include a core of a ternary semiconductor material, e.g., a core of the formula $M_1M_2X$, where $M_1$ and $M_2$ can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In another embodiment, the colloidal nanocrystals include a core of a quaternary semiconductor material, e.g., a core of the formula $M_1M_2M_3X$, where $M_1$, $M_2$ and $M_3$ can be cadmium, zinc, mercury, aluminum, lead, tin, gallium, indium, thallium, magnesium, calcium, strontium, barium, copper, and mixtures or alloys thereof and X is sulfur, selenium, tellurium, nitrogen, phosphorus, arsenic, antimony, and mixtures or alloys thereof. In other embodiments, the colloidal nanocrystals include a core of a quaternary semiconductor material, e.g., a core of a formula such as $M_1X_1X_2$, $M_1M_2X_1X_2$, $M_1M_2M_3X_1X_2$, $M_1X_1X_2X_3$, $M_1M_2X_1X_2X_3$ or $M_1M_2M_3X_1X_2X_3$, where $M_1$, $M_2$ and $M_3$ can be cadmium, zinc, mercury, aluminum, lead, tin, gallium, indium, thallium, magnesium, calcium, strontium, barium, copper, and mixtures or alloys thereof and $X_1$, $X_2$ and $X_3$ can be sulfur, selenium, tellurium, nitrogen, phosphorus, arsenic, antimony, and mixtures or alloys thereof. In one embodiment, the colloidal nanocrystals are of silicon or germanium. In some instances, oxides such as zinc oxide (ZnO) and the like may be used as well. Examples include cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), aluminum nitride (AlN), aluminum sulfide (AlS), aluminum phosphide (AlP), aluminum arsenide (AlAs), aluminum antimonide (AlSb), lead sulfide (PbS), lead selenide (PbSe), lead telluride (PbTe), gallium arsenide (GaAs), gallium nitride (GaN), gallium phosphide (GaP), gallium antimonide (GaSb), indium arsenide (InAs), indium nitride (InN), indium phosphide (InP), indium antimonide (InSb), thallium arsenide (TlAs), thallium nitride (TlN), thallium phosphide (TlP), thallium antimonide (TlSb), zinc cadmium selenide (ZnCdSe), indium gallium nitride (InGaN), indium gallium arsenide (InGaAs), indium gallium phosphide (InGaP), aluminum indium nitride (AlInN), indium aluminum phosphide (InAlP), indium aluminum arsenide (InAlAs), aluminum gallium arsenide (AlGaAs), aluminum gallium phosphide (AlGaP), aluminum indium gallium arsenide (AlInGaAs), aluminum indium gallium nitride (AlInGaN) and the like, mixtures of such materials, or any other semiconductor or similar materials. In another embodiment, the colloidal nanocrystals include a core of a metallic material such as gold (Au), silver (Ag), cobalt (Co), iron (Fe), nickel (Ni), copper (Cu), manganese (Mn), alloys thereof and alloy combinations.

Additionally, the core of any semiconductor material or of any metallic material can have an overcoating on the surface of the core. The overcoating can also be a semiconductor material, such an overcoating having a composition different than the composition of the core. The overcoating on the surface of the colloidal nanocrystals can include materials selected from among Group II-VI compounds, Group II-V compounds, Group III-VI compounds, Group III-V compounds, Group IV-VI compounds, Group I-III-VI compounds, Group II-IV-V compounds, and Group II-IV-VI compounds. Examples include cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), aluminum nitride (AlN), aluminum phosphide (AlP), aluminum arsenide (AlAs), aluminum antimonide (AlSb), gallium arsenide (GaAs), gallium nitride (GaN), gallium phosphide (GaP), gallium antimonide (GaSb), indium arsenide (InAs), indium nitride (InN), indium phosphide (InP), indium antimonide (InSb), thallium arsenide (TlAs), thallium nitride (TlN), thallium phosphide (TlP), thallium antimonide (TlSb), lead sulfide (PbS), lead selenide (PbSe), lead telluride (PbTe), zinc cadmium selenide (ZnCdSe), indium gallium nitride (InGaN), indium gallium arsenide (InGaAs), indium gallium phosphide (InGaP), aluminum indium nitride (AlInN), indium aluminum phosphide (InAlP), indium aluminum arsenide (InAlAs), aluminum gallium arsenide (AlGaAs), aluminum gallium phosphide (AlGaP), aluminum indium gallium arsenide (AlInGaAs), aluminum indium gallium nitride (AlInGaN) and the like, mixtures of such materials, or any other semiconductor or similar materials. The overcoating upon the core material can include a single shell or can include multiple shells for selective tuning of the properties. The multiple shells can be of differing materials.

In a first process of the present invention, colloidal nanocrystals are mixed with a lower alcohol, a non-polar solvent and a sol-gel precursor material, and the resultant solution can be used to form a solid composite. For example, the solution can be deposited onto a suitable substrate to yield homogeneous, solid composites from the solution of colloidal nanocrystals and sol-gel precursor. By homogeneous, it is meant that the colloidal nanocrystals are uniformly dispersed in the resultant product. In some instances, non-uniform dispersal of the colloidal nanocrystals is acceptable. In some embodiments of the invention, the solid composites can be transparent or optically clear. This first process of the present invention is a simple straight-forward process for preparing such solid composites.

The lower alcohol used in this process is generally an alcohol containing from one to four carbon atoms, i.e., a $C_1$ to $C_4$ alcohol. Among the suitable alcohols are included methanol, ethanol, n-propanol, isopropanol, n-butanol, sec-butanol and t-butanol. The non-polar solvent is used in the process to solubilize the colloidal nanocrystals and should be misible with the lower alcohol. The non-polar solvent is generally chosen from among tetrahydrofuran, toluene, xylene and the like. Tetrahydrofuran is a preferred non-polar solvent in this process.

Sol-gel processes generally refer to the preparation of a ceramic material by preparation of a sol, gelation of the sol and removal of the solvent. Sol-gel processes are advantageous because they are relatively low-cost procedures and are capable of coating long lengths or irregularly shaped substrates. In forming the sol-gel based solution used in the processes of the present invention, suitable sol-gel precursor materials are mixed with the other components.

Sol-gel processes can be carried out as described by Brinker et al, "Sol-Gel Science, The Physics and Chemistry of Sol-Gel Processing", Academic Press, 1990. Among suitable sol-gel precursor materials are included metal alkoxide compounds, metal halide compounds, metal hydroxide compounds, combinations thereof and the like where the metal is a cation from the group of silicon, titanium, zirconium, and aluminum. Other metal cations such as vanadium, iron, chromium, tin, tantalum and cerium may be used as well. Sol solutions can be spin-cast, dip-coated, or sprayed onto substrates in air. Sol solutions can also be cast into desired shapes by filling molds or cavities as well. Among the suitable metal alkoxide compounds can be included titanium tetrabutoxide (titanium(IV) butoxide), titanium tetraethoxide, titanium tetraisopropoxide, zirconium tetraisopropoxide, tetraethoxysilane (TEOS). Among suitable halide compounds can be included titanium tetrachloride, silicon tetrachloride, aluminum trichloride and the like. The sol-gel based solutions generated in this first process of the present invention are highly processable. They can be used to form solid composites in the shape of planar films and can be used to mold solid composites of various other shapes and configurations. In this first process of the present invention, volume fractions or loadings of the colloidal nanocrystals have been prepared as high as about 13 percent by volume and may be as high as up to about 30 percent by volume. Further, the first process of the present invention has allowed preparation of solid composites with a refractive index of 1.9, such refractive index values being tunable.

A second process of the present invention relies upon ligand-exchange of surface capping agents on semiconductor colloidal nanocrystals with a multi-functional compound of the formula $X_x\text{—}(Z_n)\text{—}Y_y$ where X can be an amino ($-NH_2$) group, a thiol ($-SH$) group, a phosphonic acid ($-PO_3H_2$) group, a phosphine oxide ($-PO$) group, a nitrile group ($-CN$), a thiocyanate group ($-SCN$), or a carboxylic acid group ($-COOH$), x is an integer and is one or more, Z can be a hydrocarbon group, such as an alkyl group, an aryl group or an alkylaryl group, a polyether group, an ethylene oxide group, a propylene oxide group or a mixture thereof, n can generally be from 1 to 20, Y can be a hydroxyl ($-OH$) group, a carboxylic acid ($-COOH$) group, a sulfonic acid ($-SO_3H$) group, a phosphonic acid group ($-PO_3H_2$) group, or a alkoxysilane group ($-Si(OX)$) and y is an integer and is one or more.

The alkyl group can be linear or branched. With x and y being an integer of one or more, the multi-functional compound can include, e.g., more than a single amino group, more than a single thiol group, more than a single phosphonic acid group, more than a single phosphine oxide group, more than a single nitrile group, more than a single thiocyanate group, more than a single alkoxysilane group or combinations thereof, as $X_x$ in combination with one or more of the groups represented by $Y_y$. Combinations of the enumerated groups represented by X may also be combined with combinations of the enumerated groups represented by Y. For example, the multi-functional compound can include the combination of functionalities such as amino-hydroxyl, thiol-hydroxyl, phosphonic acid-hydroxyl, phosphine oxide-hydroxyl, amino-carboxylic acid, thiol-carboxylic acid, phosphonic acid-carboxylic acid, phosphine oxide-carboxylic acid, amino-sulfonic acid, thiol-sulfonic acid, phosphonic acid-sulfonic acid, phosphine oxide-sulfonic acid, amino-phosphonic acid, thiol-phosphonic acid, and phosphine oxide-phosphonic acid. Exemplary materials include 2-aminoethanol, 2-amino-1-propanol, 3-amino-1-propanol, 2-amino-1-butanol, 3-amino-1-butanol, 4-amino-1-butanol, 3-amino-2-butanol, 2-amino-1-phenyl-1-butanol, 6-amino-1-hexanol, p-aminobenzenesulfonic acid, 3-aminobutyric acid, 4-aminobutyric acid, 4-amino-2-hydroxybutyric acid, 1,3-diamino-2-propanol, 3-mercaptopropionic acid, 4-phosphonobutyric acid, 3-aminopropyltriethoxysilane, (3-mercaptopropyl)trimethoxysilane, 3-(dimethoxymethylsilyl)-1-propanethiol, 3-mercapto-1-propanol, 4-mercapto-1-butanol, 6-mercapto-1-hexanol, 3-hydroxypropionitrile, 6-hydroxyhexanoic acid, 4-hydroxybutylphosphonic acid, tris(hydroxypropyl)phosphine oxide, bis(dibutyl)(hydroxypropyl)phosphine oxide and the like.

The result of the ligand-exchange of surface capping agents on semiconductor colloidal nanocrystals with the multi-functional compound is the formation of a colloidal nanocrystal solution including colloidal nanocrystals having at least a portion of hydroxyl-terminated, carboxylic acid-terminated groups, sulfonic acid-terminated groups, siloxy-terminated groups, or phosphonic acid-terminated groups thereon. This solution is generally homogeneous.

Subsequently, upon addition of a sol-gel precursor material, the colloidal nanocrystals can actually become part of a sol-gel matrix during a sol-gel polymerization reaction. For example, the solution can be deposited onto a suitable substrate to yield homogeneous, solid composites from the solution of colloidal nanocrystals and sol-gel precursor. By homogeneous, it is meant that the colloidal nanocrystals are uniformly dispersed in the resultant product. In some embodiments of the invention, the solid composites can be transparent or optically clear. Films can be prepared simply by spin-casting such a sol solution onto a suitable substrate.

The sol-gel based solutions generated in this second process of the present invention are highly processable. They can be used to form solid composites in the shape of planar films and can be used to mold solid composites of various other shapes and configurations. This second process can yield solid composites with very high volume loadings of colloidal nanocrystals (up to 20% for CdSe colloidal nanocrystals, nearly twice any previously reported values) and tunable refractive indices (up to 2.1).

In another aspect of the present invention, the resultant product of the ligand-exchange of surface capping agents on semiconductor colloidal nanocrystals with the multifunctional compounds yields an intermediate product of alcohol-soluble colloidal nanocrystals. Alcohol solubility is needed for compositions that are to be reacted with sol-gel precursors where water soluble compositions would not be efficient. Accordingly, such alcohol-soluble colloidal nanocrystals can be subsequently incorporated into a sol-gel matrix in forming a solid composite. Such alcohol-soluble colloidal nanocrystals are stable and have been successfully stored for months until subsequent use. The alcohol-soluble colloidal nanocrystals can be stored in an alcohol such as ethanol or may be stored as dry particles.

For the processes of the present invention, the colloidal nanocrystals can include all types of nanocrystals capped with hydrophobic ligands, including, e.g., semiconductor NQDs such as cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), aluminum nitride (AlN), aluminum phosphide (AlP), aluminum arsenide (AlAs), aluminum antimonide (AlSb), gallium arsenide (GaAs), gallium nitride (GaN), gallium phosphide (GaP), gallium antimonide (GaSb), indium arsenide (InAs), indium nitride (InN), indium phosphide (InP), indium antimonide (InSb), thallium arsenide (TlAs), thallium nitride (TlN), thallium phosphide (TlP), thallium antimonide (TlSb), lead sulfide (PbS), lead selenide (PbSe), lead telluride (PbTe), silicon (Si), germanium (Ge) and mixtures of such materials. The colloidal nanocrystals can also be metal nanoparticles such as gold (Au), silver (Ag), cobalt (Co), iron (Fe), nickel (Ni), copper (Cu), manganese (Mn), alloys thereof and alloy combinations thereof.

Each of the present processes can provide resultant films that are optically transparent and hard. The colloidal nanocrystals are contained within a stable environment and the narrow size dispersity of the colloidal nanocrystals within these materials is preserved. Of the present processes, the particular process employed can depend upon the ultimate application of interest. That is, for applications requiring high volume loadings or high refractive indices, the second process can be preferred, and for applications requiring simplicity or convenience, the first process can be preferred.

The solid composites prepared in the processes of the present invention show improved photostability for the colloidal nanocrystals within the solid composite. This enhanced stability is in comparison to similar colloidal nanocrystals not incorporated into such solid matrices or hosts. The solid composites may be useful as phosphor materials for use in, e.g., light emitting diodes and solid state lighting structures. Additionally, the solid composites demonstrate strong nonlinear optical and optical gain properties and may be used as active waveguides for nonlinear optical switching and optical amplification. The processability of the sol-gel solutions and the photostability of the resultant solid composites allow for their use as the active medium in optical devices including optical memory devices. These types of solid composites can have application as the active medium in dynamic holography devices used in optical communications and optical information processing. For example, all-optical switching and optical image correlation may be facilitated by solid composites of the present invention. Also, the solid composites can be the active media in solid state lasers.

The present invention is more particularly described in the following examples which are intended as illustrative only, since numerous modifications and variations will be apparent to those skilled in the art.

CdSe and (CdSe)ZnS core-shell colloidal nanocrystals were synthesized as previously described by Murray et al., J. Am. Chem. Soc., v. 113, 8706 (1993), by Dabbousi et al., J. Phys. Chem. B, v. 101, 9463 (1997), and by Qu et al., J. Am. Chem. Soc., v. 124, 2049 (2002).

EXAMPLE 1

The colloidal nanocrystals were first isolated from their growth environment by several rounds of precipitation, which involved solubilizing the colloidal nanocrystals in hexane or chloroform and then precipitating the colloidal nanocrystals from these solvents with acetone or methanol. The colloidal nanocrystals were taken into an inert atmosphere dry box. For 17 milligrams (mg) of CdSe colloidal nanocrystals, 0.15 milliliter (mL) of tetrahydrofuran and 0.075 mL of ethanol were added along with 15 mg of titanium(IV) butoxide. The solution was stirred with heating between 40° C. and 65° C. for from 3 to 6 hours, filtered, and then spin-coated onto a substrate, such as a microscopic slide. Under these conditions, CdSe volume loadings as high as 13% have been achieved with a film refractive index of 1.9. To adjust these values, the relative amounts of colloidal nanocrystals, solvents and titanium(IV) butoxide can be varied. This procedure is applicable to colloidal nanocrystals of a variety of shapes (spheres, rods, or other geometries) and compositions (Group II-VI compounds, Group II-V compounds, Group III-VI compounds, Group III-V compounds, Group IV-VI compounds, and the like).

EXAMPLE 2

CdSe colloidal nanocrystals prepared in accordance with Qu et al. were washed several times with acetone and methanol to remove all unbound ligand. This step often causes a dramatic decrease in photoluminescence (PL) quantum yields (QYs), often to less than a third of the original value. To improve the QYs, the colloidal nanocrystals were allowed to stir in octylamine overnight. The CdSe colloidal nanocrystals were precipitated from solution with methanol, the solvent was removed, and the colloidal nanocrystals were taken into the inert atmosphere dry box. For 75 mg of CdSe colloidal nanocrystals, 0.1 mL of tetrahydrofuran, 0.6 mL of 1-propanol, and 45-50 mg of 6-amino-1-hexanol were added. The solution was stirred for several minutes until the mixture was homogeneous. At this point, 45 mg of titanium(IV) butoxide was added, and the solution was allowed to stir at 60° C. for from 4 to 6 hours. The colloidal nanocrystals become incorporated into the titania sol in a manner as depicted in FIG. 1. The solution was filtered, and the films were prepared by spin-coating the sol onto a microscope slide. The films were dried in air overnight or alternatively could be dried by heating on a hot plate stabilized at 100° C. for 1 to 2 minutes.

This procedure gave rise to nanocomposites with a refractive index of 2.1 and volume loadings of CdSe colloidal nanocrystals as high as 20%. These values can be adjusted by changing the ratios of titanium (W) butoxide and 6-amino-1-hexanol to colloidal nanocrystals. This procedure is applicable to colloidal nanocrystals of a variety of shapes (spheres, rods, or other geometries) and compositions (Group II-VI compounds, Group II-V compounds, Group III-VI compounds, Group III-V compounds, Group IV-VI compounds, and the like). In addition, while 6-amino-1-hexanol was used, the procedure works with a variety of ligand headgroups, (e.g., phosphines, thiols, phosphonic acids and the like) and a variety of amphiphilic groups including alcohols with the described functionalities as well as carboxylic acids with the same. The procedure can be used to make silica-based solid composites in addition to the titania-based solid composites. —Solvents other than 1-propanol can be used as well, e.g., other alcohols such as ethanol, butanol, and the like.

Although the present invention has been described with reference to specific details, it is not intended that such details should be regarded as limitations upon the scope of the invention, except as and to the extent that they are included in the accompanying claims.

What is claimed is:

1. Alcohol-soluble colloidal nanocrystals comprising:
a reaction product of colloidal nanocrystals and a multi-functional compound of the formula $X_x$—$(Z_n)$—$Y_y$ where X is an amino group, a thiol group, a phosphonic acid group, a phosphine oxide group, a nitrile group, a thiocyanate group, or a carboxylic acid group, x is an integer and is one or more, Z is a hydrocarbon group, a polyether group, an ethylene oxide group, a propylene oxide group or a mixture thereof, n is from 1 to 20, Y is a hydroxyl group, a carboxylic acid group, a sulfonic acid group, a phosphonic acid group, or an alkoxysilane group and y is an integer and is one or more.

2. The alcohol-soluble colloidal nanocrystals of claim 1 wherein said colloidal nanocrystals are overcoated with said multi-functional compound of the formula $X_x$—$(Z_n)$—$Y_y$ including functionalities selected from the group consisting of amino-hydroxyl, thiol-hydroxyl, phosphonic acid-hydroxyl, and amino-carboxylic acid.

3. The alcohol-soluble colloidal nanocrystals of claim 1 wherein said colloidal nanocrystals are overcoated with multi-functional molecules including amino-hydroxyl functionalities.

4. The alcohol-soluble colloidal nanocrystals of claim 1 wherein said colloidal nanocrystals are selected from the group consisting of $M_1X_1$, $M_1M_2X_1$, $M_1M_2M_3X_1$, $M_1X_1X_2$, $M_1M_2X_1$, $X_2M_1M_2M_3X_1X_2$, $M_1X_1X_2X_3$, $M_1M_2X_1X_2X_3$, and $M_1M_2M_3X_1X_2X_3$, where $M_1$, $M_2$, and $M_3$ are each selected from the group consisting of Zn, Cd, Hg, Al, Ga, In, TI, Pb, Sn, Mg, Ca, Sr, Ba, mixtures and alloys thereof and $X_1$, $X_2$, and $X_3$ are each selected from the group consisting of S, Se, Te, As, Sb, N, P, mixtures and alloys thereof, Si, Ge, Au, Ag, Co, Fe, Ni, Cu, Mn and alloys of Au, Ag, Co, Fe, Ni, Cu, Mn or alloy combinations thereof.

* * * * *